(12) United States Patent
Kaneko

(10) Patent No.: US 9,401,629 B2
(45) Date of Patent: Jul. 26, 2016

(54) ROTARY ELECTRIC MACHINE AND BEARING CHANGING METHOD

(75) Inventor: Kenta Kaneko, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 395 days.

(21) Appl. No.: 14/123,386

(22) PCT Filed: Jun. 2, 2011

(86) PCT No.: PCT/JP2011/062719
§ 371 (c)(1),
(2), (4) Date: Dec. 2, 2013

(87) PCT Pub. No.: WO2012/164726
PCT Pub. Date: Dec. 6, 2012

(65) Prior Publication Data
US 2014/0091680 A1     Apr. 3, 2014

(51) Int. Cl.
| | |
|---|---|
| *H02K 15/02* | (2006.01) |
| *H02K 9/08* | (2006.01) |
| *H02K 15/00* | (2006.01) |
| *B23P 15/00* | (2006.01) |
| *F16C 35/04* | (2006.01) |
| *H02K 5/173* | (2006.01) |

(52) U.S. Cl.
CPC ............... *H02K 9/08* (2013.01); *B23P 15/003* (2013.01); *F16C 35/042* (2013.01); *H02K 5/1732* (2013.01); *H02K 15/0006* (2013.01); *Y10T 29/49009* (2015.01)

(58) Field of Classification Search
USPC .......................................... 310/60 R, 90, 425
See application file for complete search history.

(56) References Cited

U.S. PATENT DOCUMENTS

| | | | | |
|---|---|---|---|---|
| 1,973,047 A | * | 9/1934 | Brown | ............... F16C 33/6659 384/516 |
| 2,988,407 A | | 6/1961 | Reed | |
| 3,644,066 A | * | 2/1972 | Heob | ................... F04D 29/547 29/889 |

(Continued)

FOREIGN PATENT DOCUMENTS

| | | |
|---|---|---|
| JP | 54-049524 U | 4/1979 |
| JP | 56-089668 U | 7/1981 |

(Continued)

OTHER PUBLICATIONS

The extended European Search Report issued on Sep. 18, 2014, by the European Patent Office in corresponding European Patent Application No. 11866655.1-1804. (8 pages).

(Continued)

*Primary Examiner* — Tran Nguyen
(74) *Attorney, Agent, or Firm* — Buchanan Ingersoll & Rooney PC

(57) ABSTRACT

A rotary electric machine includes a stator core; a rotor that includes a laminated core, core holders, and cooling fans; a frame that includes a tubular unit that encloses the stator core and the rotor, and a first bracket and a second bracket that extend in a direction of a rotor shaft and supports the rotor shaft; and cartridges that are detachably attached to the first bracket and the second bracket and rotatably supports the rotor shaft, wherein groove-like or hole-like holding portions, which hold end portions of bearing attaching and detaching jigs inserted through the first bracket and the second bracket, are provided in the cooling fans.

6 Claims, 5 Drawing Sheets

(56) References Cited

U.S. PATENT DOCUMENTS

| | | | |
|---|---|---|---|
| 3,930,695 A * | 1/1976 | Forrest | F16C 35/067 295/48 |
| 6,891,290 B2 | 5/2005 | Nagayama et al. | |
| 2013/0181559 A1 | 7/2013 | Kaneko | |
| 2014/0091680 A1 | 4/2014 | Kaneko | |

FOREIGN PATENT DOCUMENTS

| | | | |
|---|---|---|---|
| JP | 06-057064 U | 8/1994 | |
| JP | 2000-136793 A | 5/2000 | |
| JP | 2004-124991 A | 4/2004 | |
| JP | 2008-099491 A | 4/2008 | |
| JP | 2009-107790 A | 5/2009 | |
| JP | 4731639 B1 | 4/2011 | |
| WO | 2012/046314 A1 | 4/2012 | |
| WO | 2012/164726 A1 | 12/2012 | |

OTHER PUBLICATIONS

International Search Report (Form PCT/ISA/210) issued on Feb. 12, 2013, by the Japanese Patent Office in the International Application No. PCT/JP2012/081206 and an English Translation of the International Search Report. (5 pages).
Written Opinion of the International Searching Authority (Form PCT/ISA/237) issued on Feb. 12, 2013, by the Japanese Patent Office in the International Application No. PCT/JP2012/081206. (4 pages).
Written Opinion of the International Searching Authority (Form PCT/ISA/237) issued on Jul. 19, 2011, by the Japanese Patent Office in the International Application No. PCT/JP2011/062719, and an English Translation of the Written Opinion of the International Searching Authority. (9 pages).
International Search Report (Forms PCT/ISA/210 and PCT/ISA/220) issued on Nov. 22, 2010, by the Japanese Patent Office in the International Application No. PCT/JP2010/067579 and an English Translation of the International Search Report. (4 pages).
Kaneko, U.S. Appl. No. 14/398,097, entitle "Rotary Electric Machine and Bearing Changing Method" filed Oct. 30, 2014.
Office Action (Notice of Rejection) issued on Jul. 31, 2012, by the Japanese Patent Office in corresponding Japanese Patent Application No. 2012-121928 and an English translation of the Office Action. (5 pages).
International Search Report (Forms PCT/ISA/210 and PCT/ISA/220) issued Jul. 19, 2011 in corresponding International Application No. PCT/JP2011/062719. (5 pages).
Office Action dated Mar. 3, 2016, issued by the U.S. Patent and Trademark Office in corresponding U.S. Appl. No. 14/398,097. (16 pgs).
Second Office Action dated Feb. 2, 2016, issued by the Chinese Patent Office in corresponding Chinese Patent Application No. 201180071323.4 and English translation (13 pages).

* cited by examiner

FIG.5
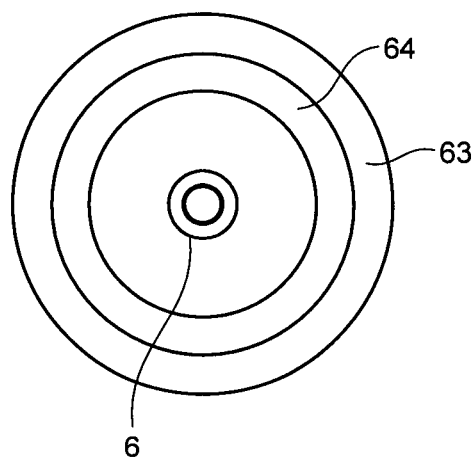
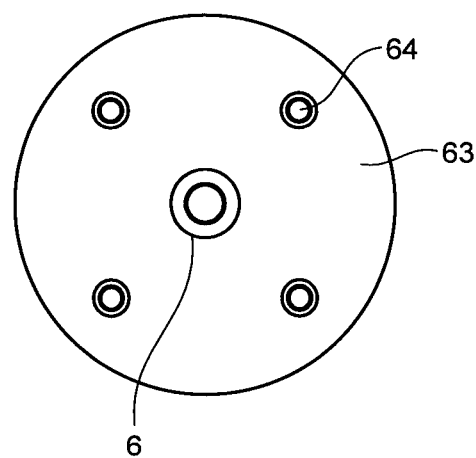

ROTARY ELECTRIC MACHINE AND BEARING CHANGING METHOD

FIELD

The present invention relates to a rotary electric machine that drives a railway vehicle and a bearing changing method.

BACKGROUND

Typically, from the standpoint of reducing maintenance, totally-enclosed rotary electric machines are often used as rotary electric machines for railway vehicles. A totally-enclosed rotary electric machine is principally composed of a tubular frame, in which a rotor is arranged on its inner peripheral side, and housings, which are arranged facing each other at both ends of the frame and which rotatably support the rotor shaft. Bearings are provided in the central portion of the housings and a cylindrical stator core, which accommodates therein stator coils, is attached to the inner peripheral portion of the frame, and a uniform space is formed between the inner peripheral surface of the stator core and the outer peripheral surface of the rotor.

With a totally-enclosed rotary electric machine configured as above, although a cleaning operation of the rotor and the like is not necessary, periodic maintenance of the bearings is necessary. When the maintenance is performed, it is typical to first extract the rotor from the frame and thereafter detach the bearings.

As a method to eliminate such an operation, the traction motor illustrated in Patent Literature 1 described below is provided with rotor supporting devices, which are for supporting the rotor, and support receiving units, which receive the rotor supporting devices. The rotor is fixed by pressing the rotor supporting devices against the support receiving units by a plurality of bolts inserted from a bearing bracket side and thereafter the housings, which fix the bearings, are disassembled.

CITATION LIST

Patent Literature

Patent Literature 1: Japanese Patent Application Laid-open 2008-99491 (FIG. 1 and the like)

SUMMARY

Technical Problem

According to the above conventional technology, the rotor supporting devices are pressed against the support receiving units by bolts inserted from the bearing bracket. However, because the rotor is supported by the frictional force at the tip portions of the rotor supporting devices, there is a problem in that it is difficult to stably fix the rotor using only this frictional force. In this case, the axial center position of the rotor is displaced from the axial center position of the frame, which leads to a problem that the inner peripheral surface of the stator core and the outer peripheral surface of the rotor may come into contact with each other and thus may be damaged, and, moreover, it may become difficult to attach and detach the bearings. Moreover, according to the above conventional technology, because the rotor supporting devices and the support receiving units need to be provided near the bearing bracket and the housings, it is difficult to secure a space for cooling the bearings with a cooling fan. Furthermore, provision of the rotor supporting devices and the support receiving units increases the mass of the rotary electric machine.

The present invention is achieved in view of the above and has an object to obtain a rotary electric machine and a bearing changing method that can simplify the operation of attaching and detaching a bearing.

Solution to Problem

In order to solve the above problems and achieve the object, the present invention includes a stator; a rotor that includes a rotor core that is arranged on an inner peripheral side of the stator and is formed by laminating magnetic steel sheets, a core holder that covers both ends of the rotor core, and a cooling fan that is attached to the core holder; a frame that includes a tubular unit that encloses the stator and the rotor, and a rotor shaft supporting unit that supports the rotor shaft; and a bearing unit that is detachably attached to the rotor shaft supporting unit and rotatably supports the rotor shaft, wherein a groove-like or hole-like holding portion, which holds an end portion of a bearing attaching and detaching jig inserted through the rotor shaft supporting unit, is provided in the cooling fan.

Advantageous Effects of Invention

According to the present invention, because the cooling fans are held by using the bearing attaching and detaching jigs, an effect is obtained where it is possible to simplify the operation of attaching and detaching the bearings.

BRIEF DESCRIPTION OF DRAWINGS

FIG. 5 is a diagram illustrating an example in which the groove-like holding portion is provided along a circumferential direction of the cooling fan, and a plurality of the hole-like holding portions are provided on a concentric circle centered on an axial center portion of the rotor shaft.

DESCRIPTION OF EMBODIMENTS

Exemplary embodiments of a rotary electric machine and a bearing changing method according to the present invention will be explained below in detail with reference to the drawings. This invention is not limited to the embodiments.

First Embodiment

Figure 1:
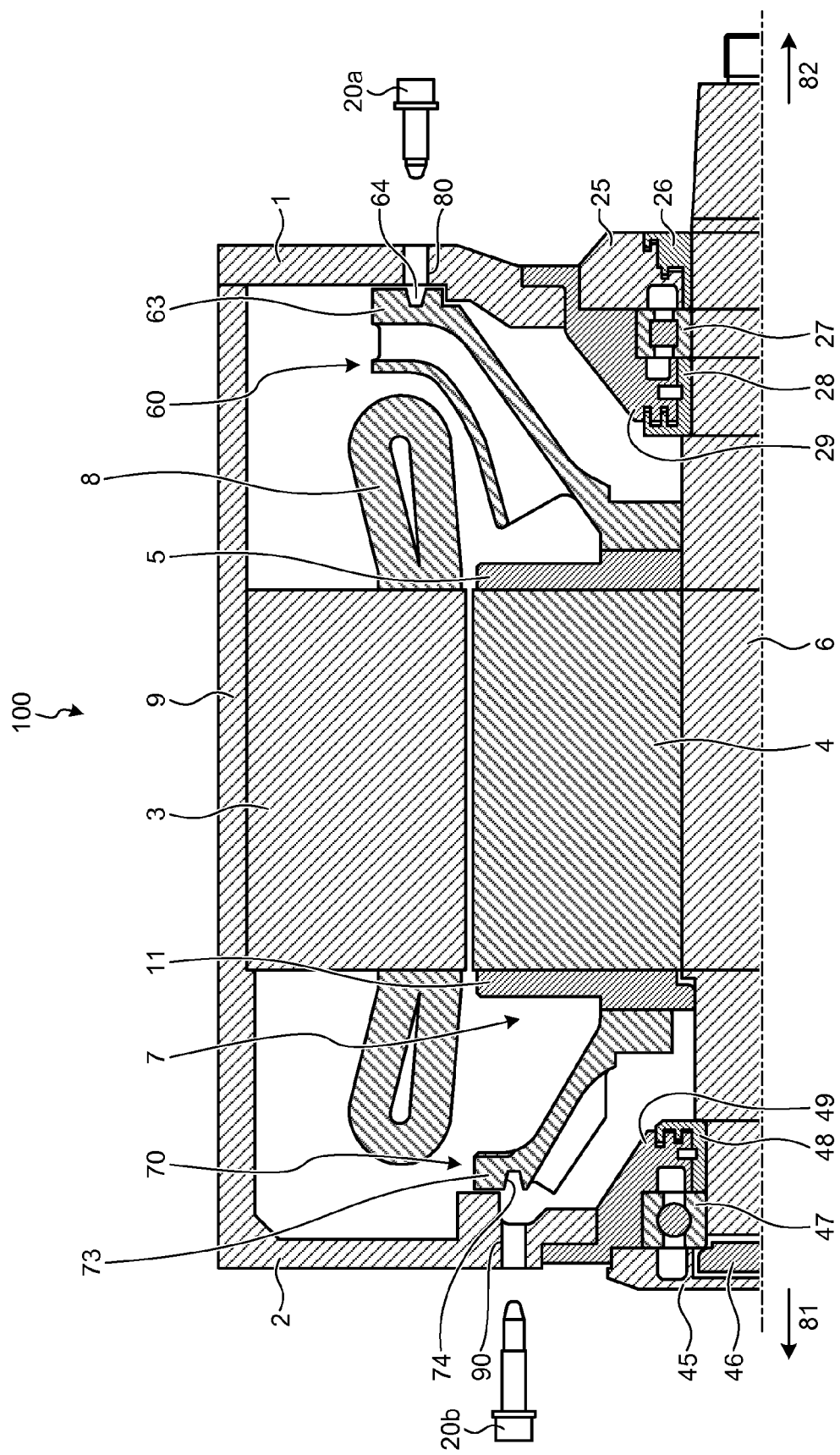
FIG. 1 is a vertical cross-sectional view of a rotary electric machine according to a first embodiment of the present invention.

FIG. 1 is a vertical cross-sectional view of a rotary electric machine 100 according to the first embodiment of the present invention. In FIG. 1, the enclosed rotary electric machine 100 is illustrated as an example. The rotary electric machine 100 includes a stator core 3, a rotor 7, a tubular unit 9, a first bracket 1, a second bracket 2, a cartridge 29, and a cartridge 49. The first bracket 1 is arranged on a drive side 82 of the tubular unit 9 and the second bracket 2 is arranged on a counter drive side 81 of the tubular unit 9. The tubular unit 9, the first bracket 1, and the second bracket 2 form the frame of the rotary electric machine 100.

The cylindrical stator core 3, which accommodates therein stator coils 8, is attached to the inner peripheral portion of the tubular unit 9 and a uniform space is formed between the inner peripheral surface of the stator core 3 and the outer peripheral surface of a laminated core 4. With such a configuration, the torque of the rotor 7 is transmitted to a wheel via a coupling and gearing (both are not illustrated) arranged on the drive side 82.

Next, an explanation will be given of a cooling fan 60 arranged on the drive side 82 of the rotor 7 and a cooling fan 70 arranged on the counter drive side 81 of the rotor 7.

The rotor 7 includes the laminated core 4 formed by laminating magnetic steel sheets, a core holder 5 that covers the drive side 82 of the laminated core 4, and a core holder 11 that covers the counter drive side 81 of the laminated core 4. FIG. 1 illustrates the cooling fan 60 attached to the drive side 82 of the core holder 5 and the cooling fan 70 attached to the counter drive side 81 of the core holder 11.

In the cooling fan 60, a plurality of blades are formed for agitating the air in the rotary electric machine 100. The blades are provided to extend in the radial direction of the rotor 7 and are arranged to stand at approximately equal intervals in the rotational direction of the rotor 7. A main plate 63 has a disk shape, is provided with a through hole into which a rotor shaft 6 is inserted, and holds one end of each blade. The shape of the cooling fan 60 is not limited to the shape illustrated in FIG. 1.

Furthermore, in the main plate 63, a holding portion 64 is circumferentially provided. The holding portion 64 holds end portions 13*a* of bearing attaching and detaching jigs 20*a* inserted through the first bracket 1 so that the cartridge 29 is attachable and detachable. The holding portion 64 is formed in the surface at which the main plate 63 faces the first bracket 1.

In the cooling fan 70, a plurality of blades are formed for agitating the air around the bearing. The blades are provided to extend in the radial direction of the rotor 7 and are arranged to stand at approximately equal intervals in the rotational direction of the rotor 7. A main plate 73 has a disk shape, is provided with a through hole into which the rotor shaft 6 is inserted, and holds one end of each blade. The shape of the cooling fan 70 is not limited to the shape illustrated in FIG. 1.

Furthermore, in the main plate 73, a holding portion 74 is circumferentially provided. The holding portion 74 holds end portions 13*b* of bearing attaching and detaching jigs 20*b* inserted through the second bracket 2. The holding portion 74 is formed in the surface at which the main plate 73 faces the second bracket 2.

With the cooling fan 60 and the cooling fan 70, when the rotor shaft 6 rotates, the air in the rotary electric machine 100 is agitated and the air heated by the rotor 7, the stator core 3, and the like is exchanged at the first bracket 1, the second bracket 2, the tubular unit 9, and the like, whereby the rotary electric machine 100 is efficiently cooled.

Next, the first bracket 1 and the cartridge 29 illustrated on the drive side 82 will be explained.

The cartridge 29 is provided on the axial center portion of the first bracket 1. The cartridge 29 is detachably fixed to the first bracket 1 by a fastening member (not illustrated) that is inserted toward the first bracket 1 from the drive side 82.

The cartridge 29 has a structure that is attachable and detachable from the drive side 82. The cartridge 29 accommodates therein a bearing 27 that rotatably supports one end of the rotor shaft 6 and includes a grease pocket for lubricating the bearing 27.

A bearing stopper 28 is provided on the rotor shaft 6. The bearing stopper 28 is arranged on the inner side of the machine relative to the bearing 27, positions the bearing 27, and forms a labyrinth structure together with the cartridge 29. The labyrinth refers to a structure that forms a boundary between the rotary portion and the stationary portion, prevents leakage of lubricating grease, and also prevents the entry of foreign matter from outside into the bearing 27 (including a bearing 47, which will be described later) and the rotary electric machine 100.

A bearing cap 25 is provided on the outer side of the machine relative to the bearing 27. The bearing cap 25 includes a grease pocket that retains lubricating grease supplied to the bearing 27 and forms a labyrinth structure together with a bearing stopper 26. The bearing cap 25 is detachably fixed by a fastening member (not illustrated) that is screwed toward the cartridge 29 from the outer side of the machine.

The bearing stopper 26 positions the bearing 27 and prevents leakage of lubricating grease to the outside of the machine by forming a labyrinth structure together with the bearing cap 25.

As described above, the labyrinth structure formed by the bearing cap 25, the bearing stopper 26, the cartridge 29, and the bearing stopper 28 can prevent leakage of lubricating grease to the outside of the machine.

Insertion holes 80, into which a plurality of the bearing attaching and detaching jigs 20*a* are inserted, are formed in the first bracket 1. Bolts (for example, bolts formed to have a length such that the tip portions thereof do not come into contact with the holding portion 64 provided in the main plate 63) shorter than the bearing attaching and detaching jigs 20*a* are screwed into the insertion holes 80 before insertion of the bearing attaching and detaching jigs 20*a*. Accordingly, the bearing attaching and detaching jigs 20*a* are attached after these bolts are removed. FIG. 1 illustrates a state when the bearing attaching and detaching jigs 20*a* are inserted into the insertion holes 80.

Next, the second bracket 2 and the cartridge 49 illustrated on the counter drive side 81 will be explained.

The cartridge 49 is provided on the axial center portion of the second bracket 2. The cartridge 49 is detachably fixed to the second bracket 2 by a fastening member (not illustrated) that is inserted toward the second bracket 2 from the counter drive side 81.

The cartridge 49 has a structure that is attachable and detachable from the counter drive side 81. The cartridge 49 accommodates therein the bearing 47 that rotatably supports one end of the rotor shaft 6 and includes a grease pocket for lubricating the bearing 47.

A bearing stopper 48 is provided on the rotor shaft 6. The bearing stopper 48 is arranged on the inner side of the machine relative to the bearing 47, positions the bearing 47, and forms a labyrinth structure together with the cartridge 49.

A bearing cap 45 is provided on the outer side of the machine relative to the bearing 47. The bearing cap 45 includes a grease pocket that retains lubricating grease supplied to the bearing 47 and forms a labyrinth structure together with a bearing stopper 46. The bearing cap 45 is detachably fixed by a fastening member (not illustrated) that is screwed toward the cartridge 49 from the outer side of the machine.

The bearing stopper 46 positions the bearing 47 and prevents leakage of lubricating grease to the outside of the machine by forming a labyrinth structure together with the cartridge 49. The bearing stopper 46 is attached to the end portion of the rotor shaft 6.

As described above, the labyrinth structure formed by the bearing cap 45, the bearing stopper 46, the cartridge 49, and the bearing stopper 48 can prevent leakage of lubricating grease to the outside of the machine.

Insertion holes 90, into which a plurality of the bearing attaching and detaching jigs 20b are inserted, are formed in the second bracket 2. Bolts (for example, bolts formed to have a length such that the tip portions thereof do not come into contact with the holding portion 74 provided in the main plate 73) shorter than the bearing attaching and detaching jigs 20b are screwed into the insertion holes 90 before insertion of the bearing attaching and detaching jigs 20b. Accordingly, the bearing attaching and detaching jigs 20b are attached after these bolts are removed. FIG. 1 illustrates a state when the bearing attaching and detaching jigs 20b are inserted into the insertion holes 90.

The distance from the center line of the rotor shaft 6 to the centers of the insertion holes 80 and 90 is set to be equal to the distance from the center line of the rotor shaft 6 to the centers of the holding portions 64 and 74.

Next, the shape of the bearing attaching and detaching jigs 20a and 20b will be explained.

Figure 2:
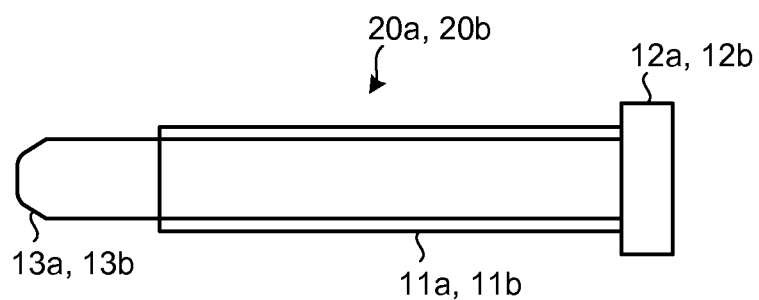
FIG. 2 is a diagram schematically illustrating bearing attaching and detaching jigs.

FIG. 2 is a diagram schematically illustrating the bearing attaching and detaching jigs 20a and 20b. The bearing attaching and detaching jigs 20a and 20b are jigs that, when the cartridges 29 and 49 are attached and detached, fix the rotor 7 without causing the laminated core 4 to come into contact with the stator core 3. The bearing attaching and detaching jigs 20a and 20b are attached to the first bracket 1 and the second bracket 2, respectively, to function as rotor supporting members. In order to prevent the axial center position of the rotor 7 from being displaced from the axial center position of the tubular unit 9, it is desirable to set the thickness of the bearing attaching and detaching jigs 20a and 20b in consideration of the weight of the rotor 7 and the like.

Externally threaded portions 11a and 11b are formed on the bearing attaching and detaching jigs 20a and 20b between bolt heads 12a and 12b and predetermined positions, respectively. The externally threaded portions 11a and 11b can be screwed into the insertion holes 80 and 90 formed in the first bracket 1 and the second bracket 2, respectively. Each of the predetermined positions is, for example, the length determined while taking the thickness of the first bracket 1 or the second bracket 2 into consideration.

The end portions 13a and 13b of the bearing attaching and detaching jigs 20a and 20b may be, for example, formed in a tapered shape that tapers toward the tips of the end portions 13a and 13b from the bolt heads 12a and 12b side, respectively, or formed in a rectangular shape.

Next, the relationship between the cross section of the end portions 13a and 13b and the cross section of the holding portions 64 and 74 will be specifically explained.

Figure 3:
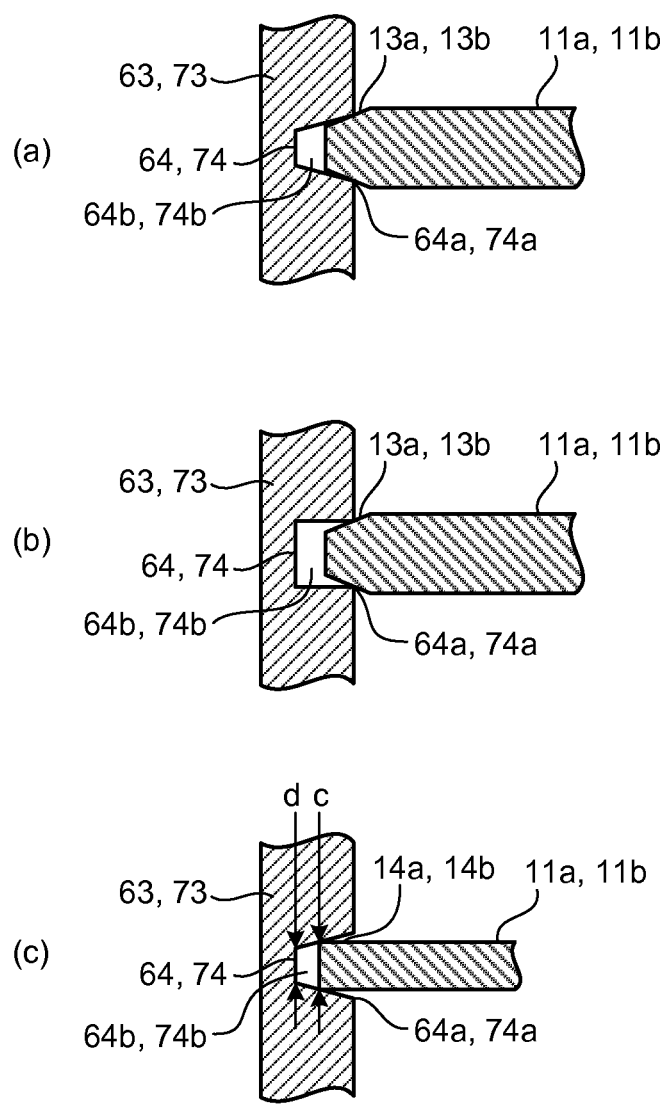
FIG. 3 is a diagram for explaining the shape of holding portions formed in cooling fans and the shape of end portions of the bearing attaching and detaching jigs.

FIG. 3 is a diagram for explaining the shape of the holding portions 64 and 74 formed in the cooling fans 60 and 70, respectively, and the shape of the end portions 13a and 13b of the bearing attaching and detaching jigs 20a and 20b. FIG. 3 illustrates the cross section of the end portions 13a and 13b of the bearing attaching and detaching jigs 20a and 20b and the cross section (cross section along the radial direction of the rotor 7) of the holding portions 64 and 74 that hold the end portions 13a and 13b (end portions 14a and 14b), respectively.

The end portions 13a and 13b illustrated in FIG. 3(a) are formed in a tapered shape that tapers toward their tips, respectively. In a similar manner, the holding portions 64 and 74 are also formed in a tapered shape. The taper angle of the holding portions 64 and 74 with respect to the longitudinal direction of the bearing attaching and detaching jigs 20a and 20b is an angle slightly smaller than the taper angle of the end portions 13a and 13b. If the taper angle of the end portions 13a and 13b is set larger than the taper angle of the holding portions 64 and 74 as described above, the rotor 7 can be fixed without causing the axial center position of the rotor 7 to be displaced from the axial center position of the tubular unit 9. Because the holding portions 64 and 74 and the end portions 13a and 13b are formed in a tapered shape, for example, even if the main plates 63 and 73 are made of a lightweight material, such as aluminum, it is possible to prevent local deformation of the holding portions 64 and 74 (for example, deformation of top portions 64a and 74a of the holding portions 64 and 74). When the end portion 13a is held in the holding portion 64, a non-contact portion 64b is formed between the end portion 13a and the bottom surface of the holding portion 64. In a similar manner, when the end portion 13b is held in the holding portion 74, a non-contact portion 74b is formed between the end portion 13b and the bottom surface of the holding portion 74.

FIG. 3(b) illustrates an example where the cross-sectional shape of the holding portions 64 and 74 is changed. The end portions 13a and 13b illustrated in FIG. 3(b) are formed in a tapered shape in a similar manner to the end portions 13a and 13b illustrated in FIG. 3(a); however, the holding portions 64 and 74 are formed in a rectangular shape. Even when the end portions 13a and 13b are formed in a tapered shape and the holding portions 64 and 74 are formed in a rectangular shape as described above, the rotor 7 can be fixed without causing the axial center position of the rotor 7 to be displaced from the axial center position of the tubular unit 9, and the man-hours required for processing the holding portions 64 and 74 can be reduced. When the end portion 13a is held in the holding portion 64, the non-contact portion 64b is formed between the end portion 13a and the bottom surface of the holding portion 64. In a similar manner, when the end portion 13b is held in the holding portion 74, the non-contact portion 74b is formed between the end portion 13b and the bottom surface of the holding portion 74.

FIG. 3(c) illustrates an example where the cross-sectional shape of the end portions 14a and 14b is changed. The holding portions 64 and 74 illustrated in FIG. 3(c) are formed in a tapered shape in a similar manner to the holding portions 64 and 74 illustrated in FIG. 3(a); however, the end portions 14a and 14b are formed in a rectangular shape. When the width of the tip portions of the end portions 14a and 14b is defined as c and the width of the bottom surfaces of the holding portions 64 and 74 is defined as d, the width c is formed to be larger than the width d. Even when the end portions 14a and 14b are formed in a rectangular shape and the holding portions 64 and 74 are formed in a tapered shape as described above, the rotor 7 can be fixed without causing the axial center position of the rotor 7 to be displaced from the axial center position of the tubular unit 9. When the end portion 14a is held in the holding portion 64, the non-contact portion 64b is formed between the end portion 14a and the bottom surface of the holding portion 64. In a similar manner, when the end portion 14b is held in the holding portion 74, the non-contact portion 74b is formed between the end portion 14b and the bottom surface of the holding portion 74.

The cross sectional shapes of the end portions 13a and 13b (or the end portions 14a and 14b) and the holding portions 64 and 74 illustrated in FIG. 3 are one example and they may also be configured as described below.

(1) First, an explanation will be given of a case where the end portions 13a and 13b are formed in a tapered shape. The end portions 13a and 13b are formed in a tapered shape such that the top portions 64a and 74a of the holding portions 64 and 74 can come into contact with the end portions 13a and 13b before the end portions 13a and 13b reach the bottom surfaces of the holding portions 64 and 74, respectively. (1a) In this case, the holding portions 64 and 74 may be formed such that the cross section along the radial direction of the rotor 7 has a tapered shape, (1b) or may be formed such that the cross section along the radial direction of the rotor 7 has a rectangular shape. The shape obtained by combining (1) and (1a) corresponds to FIG. 3(a) and the shape obtained by combining (1) and (1b) corresponds to FIG. 3(b).

(2) Next, an explanation will be given of a case where the holding portions 64 and 74 are formed in a tapered shape. The holding portions 64 and 74 are formed in a tapered shape such that the end portions 13a and 13b can come into contact with the side surfaces of the holding portions 64 and 74 before the end portions 13a and 13b reach the bottom surfaces of the holding portions 64 and 74, respectively. (2a) In this case, the end portions 13a and 13b may be formed in a rectangular shape (for example, the end portions 14a and 14b), (2b) or may be formed in a tapered shape. The shape obtained by combining (2) and (2a) corresponds to FIG. 3(c).

When the end portions 13a and 13b are formed in a round shape (curved shape), even if the main plates 63 and 73 are made of a material (such as aluminum) softer than the bearing attaching and detaching jigs 20a and 20b, the main plates 63 and 73 can be prevented from being damaged.

Next, the bearing changing method of the rotary electric machine 100 according to the first embodiment will be explained.

Figure 4:
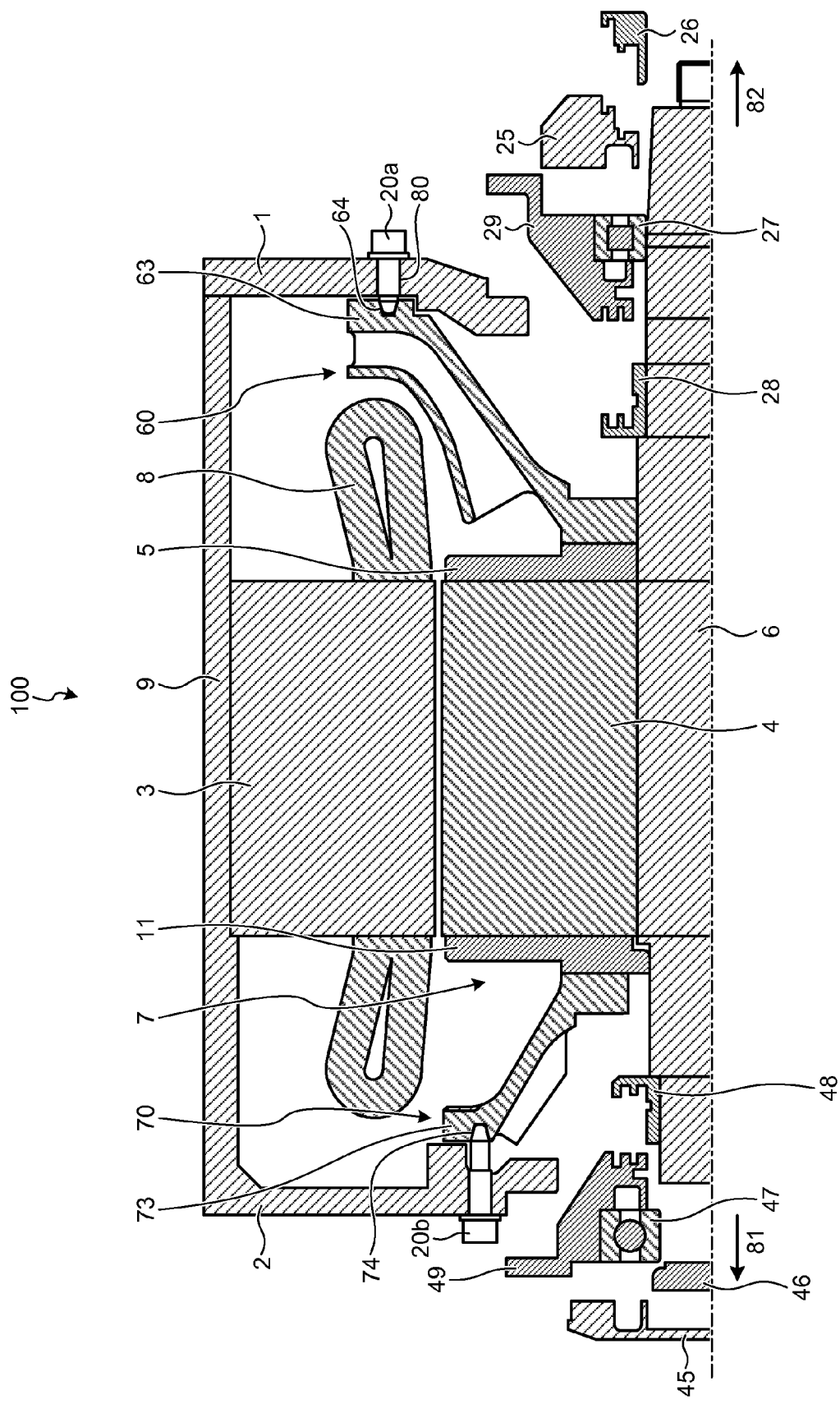
FIG. 4 is a diagram illustrating a state where the bearing attaching and detaching jigs are attached to a first bracket and the bearing attaching and detaching jigs are attached to a second bracket.

FIG. 4 is a diagram illustrating a state where the bearing attaching and detaching jigs 20a are attached to the first bracket 1 and the bearing attaching and detaching jigs 20b are attached to the second bracket 2. First, an operation of detaching the cartridges 29 and 49 will be explained. When the bearing attaching and detaching jigs 20a and 20b are inserted into the insertion holes 80 and 90, respectively, if a gap is generated between the end portions 13a and 13b and the holding portions 64 and 74, respectively, the axial center position of the rotor 7 may be displaced and the outer peripheral surface of the laminated core 4 may interfere with the inner peripheral surface of the stator core 3. In order to prevent such interference, it is desirable that the bearing attaching and detaching jigs 20a and 20b be screwed in until the end portions 13a and 13b thereof come into contact with the holding portions 64 and 74, respectively.

As illustrated in FIG. 4, when the end portions 13a and 13b of the bearing attaching and detaching jigs 20a and 20b are held in the holding portions 64 and 74, respectively, the cooling fans 60 and 70 are fixed by the bearing attaching and detaching jigs 20a and 20b, respectively. Accordingly, the rotor 7 is also fixed by the bearing attaching and detaching jigs 20a and 20b; therefore, even when the cartridges 29 and 49 are detached in this state, the laminated core 4 does not come into contact with the stator core 3.

On the drive side 82, the cartridge 29 can be detached by removing a fastening member (not illustrated). On the counter drive side 81, the cartridge 49 can be detached by removing a fastening member (not illustrated) in a similar manner.

Next, an explanation will be given of the operation of attaching the new cartridges 29 and 49 in which the bearings 27 and 47 and lubricating grease are changed. On the drive side 82, the cartridge 29 is attached to the first bracket 1, and, thereafter, the bearing attaching and detaching jigs 20a are detached from the insertion holes 80, and bolts (not illustrated) are screwed into the insertion holes 80. On the counter drive side 81, the cartridge 49 is attached to the second bracket 2, and, thereafter, the bearing attaching and detaching jigs 20b are detached from the insertion holes 90, and bolts (not illustrated) are screwed into the insertion holes 90.

It is desirable that the number of the bearing attaching and detaching jigs 20a and the number of the bearing attaching and detaching jigs 20b be three or more in order to stably fix the rotor 7. In this case, the number of the insertion holes 80 (the insertion holes 90) formed in the first bracket 1 (or the second bracket 2) is equal to or more than the number corresponding to the number of the bearing attaching and detaching jigs 20a (the bearing attaching and detaching jigs 20b), and the insertion holes 80 (the insertion holes 90) are arranged, for example, at equal intervals on a concentric circle centered on the axial center portion of the rotor shaft 6.

As explained above, the rotary electric machine 100 according to the first embodiment includes the stator core (stator) 3; the rotor 7 that includes the laminated core (rotor core) 4 that is arranged on the inner peripheral side of the stator core 3 and is formed by laminating magnetic steel sheets, the core holders 5 and 11 that cover both ends of the laminated core 4, and the cooling fans 60 and 70 that are attached to the core holders 5 and 11; the frame that includes the tubular unit 9 enclosing the stator core 3 and the rotor 7 and the rotor shaft supporting units (the first bracket 1 and the second bracket 2) that support the rotor shaft 6, the frame extending in a direction of the rotor shaft; and the cartridges (bearing units) 29 and 49 that are detachably attached to the rotor shaft supporting units (1, 2) and rotatably support the rotor shaft 6, wherein the groove-like holding portions 64 and 74, which hold the end portions 13a and 13b of the bearing attaching and detaching jigs 20a and 20b that are inserted through the rotor shaft supporting units (1, 2), are provided in the cooling fans 60 and 70. Therefore, when the cartridges 29 and 49 are attached and detached, the rotor 7 can be fixed in the radial direction (the radial direction of the rotor 7) simply by fastening the bearing attaching and detaching jigs 20a and 20b into the insertion holes 80 and 90, respectively. The clearance between the outer peripheral surface of the rotor 7 and the inner peripheral surface of the stator core 3 is typically about a few millimeters. Therefore, attachment and detachment of the cartridges 29 and 49 after extracting the rotor 7 from the tubular unit 9 should be done with extreme caution so that the outer peripheral surface of the rotor 7 does not come into contact with the inner peripheral surface of the stator core 3. In the conventional technology described above, the configuration is such that the rotor supporting devices and the like are provided near the bearing bracket and housings so as to simplify the operation of attaching and detaching the bearings. However, there are problems in that it is difficult to secure a space for cooling the bearings by using a cooling fan and the mass and cost of the rotary electric machine increases. The rotary electric machine 100 according to the first embodiment is such that the insertion holes 80 and 90 into which the bearing attaching and detaching jigs 20a and 20b are to be inserted are provided in the first bracket 1 (or the second bracket 2) and the groove-like holding portions 64 and 74 are provided in the cooling fans 60 and 70. Therefore, the rotor 7 can be fixed without using the rotor supporting devices and the like of the conventional technology and without substantially causing the axial center position of the rotor 7 to be displaced from the axial center position of the tubular unit 9. As a result, the operation of attaching and detaching the bearings can be simplified and the bearing cooling space can be secured. Furthermore, it is possible to manufacture a lighter rotary electric machine at a lower cost than conventional rotary electric machines.

Moreover, according to the rotary electric machine 100 in the first embodiment, it is not necessary to extract the rotor 7 from the tubular unit 9; therefore, it is not necessary to use a crane to suspend the rotor 7 that is for a railway vehicle and weighs 100 kg or more, a special jig for disassembling the cartridges 29 and 49, and the like. Particularly, in the case of a permanent-magnet excited synchronous machine, the rotor 7 generates a strong magnetic force; therefore, when the rotor 7 is extracted from the tubular unit 9, the magnetic bodies around the rotary electric machine 100 during maintenance may be attracted to the rotor 7 and a repulsion force or an attractive force may be generated between the extracted rotor 7 and the tubular unit 9. According to the rotary electric machine 100 in the first embodiment, the cartridges 29 and 49 can be changed without such a risk.

Moreover, the groove-like holding portions 64 and 74 are provided along the circumferential direction of the cooling fans 60 and 70, respectively; therefore, the end portions 13a and 13b of the bearing attaching and detaching jigs 20a and 20b can be held without being limited by the position of the rotor 7 in the rotational direction.

Moreover, as illustrated in FIG. 3(a), the holding portions 64 and 74 according to the first embodiment are formed in a tapered shape such that the end portions 13a and 13b can come into contact with the side surfaces of the holding portions 64 and 74, respectively, and the non-contact portions 64b and 74b are formed between the end portions 13a and 13b and the bottom surfaces of the holding portions 64 and 74, respectively. With such a configuration, the rotor 7 can be fixed without causing the axial center position of the rotor 7 to be displaced from the axial center position of the tubular unit 9.

Moreover, as illustrated in FIG. 3(c), the holding portions 64 and 74 according to the first embodiment are formed in a tapered shape such that the end portions 14a and 14b can come into contact with the side surfaces of the holding portions 64 and 74, respectively, and the non-contact portions 64b and 74b are formed between the end portions 14a and 14b and the bottom surfaces of the holding portions 64 and 74, respectively. With such a configuration also, the rotor 7 can be fixed without causing the axial center position of the rotor 7 to be displaced from the axial center position of the tubular unit 9.

Moreover, the bearing attaching and detaching jigs 20a and 20b according to the first embodiment are formed into a bolt shape such that they are inserted into the rotor shaft supporting units (1, 2) and are held in the holding portions 64 and 74 provided in the cooling fans 60 and 70, respectively. Therefore, when the cartridges 29 and 49 are attached and detached, the rotor 7 can be fixed without causing the laminated core 4 to come into contact with the stator core 3, and, moreover, the bearing attaching and detaching jigs 20a and 20b can be manufactured by processing typical fastening members (such as bolts) and thus can be manufactured at low cost.

Moreover, the bearing changing method according to the first embodiment includes a jig attaching step of attaching the bearing attaching and detaching jigs 20a and 20b that are inserted into the rotor shaft supporting units (1, 2) and are held in the holding portions 64 and 74 provided in the cooling fans 60 and 70 to the rotor shaft supporting units (1, 2); a rotor fixing step of causing the holding portions 64 and 74 to hold the end portions 13a and 13b (the end portions 14a and 14b) of the bearing attaching and detaching jigs 20a and 20b and fixing the rotor 7 by screwing the bearing attaching and detaching jigs 20a and 20b into the rotor shaft supporting units (1, 2); and a bearing changing step of detaching the cartridges 29 and 49 from the rotor shaft supporting units (1, 2) and attaching the new cartridges 29 and 49 to the rotor shaft supporting units (1, 2). Therefore, when the cartridges 29 and 49 are attached and detached, the bearings 27 and 47 can be changed without causing the laminated core 4 to come into contact with the stator core 3 and easily compared with a method of the conventional technology.

Moreover, as illustrated in FIG. 3(a) and FIG. 3(b), the end portions 13a and 13b of the bearing attaching and detaching jigs 20a and 20b are formed in a tapered shape such that the top portions 64a and 74a of the holding portions 64 and 74 can come into contact with the end portions 13a and 13b before the end portions 13a and 13b reach the bottom surfaces of the holding portions 64 and 74, respectively. In this case, the holding portions 64 and 74 may be formed in a tapered shape as illustrated in FIG. 3(a) or may be formed in a rectangular shape as illustrated in FIG. 3(b). With such a configuration, the rotor 7 can be fixed without causing the axial center position of the rotor 7 to be displaced from the axial center position of the tubular unit 9.

Second Embodiment

The rotary electric machine 100 according to the first embodiment is configured such that the bearing attaching and detaching jigs 20a and 20b are held by the holding portions 64 and 74 formed in the cooling fans 60 and 70, respectively. The rotary electric machine 100 according to the second embodiment is configured such that hole-like depressions (holding portions) that hold the bearing attaching and detaching jigs 20a and 20b are provided in the cooling fans 60 and 70 instead of the holding portions 64 and 74, respectively, and the bearing attaching and detaching jigs 20a and 20b are held by the hole-like holding portions. The rotary electric machine 100 according to the second embodiment is an embodiment in which the holding portions 64 and 74 illustrated in FIG. 1 are changed to hole-like holding portions. Therefore, in the following explanation, the rotary electric machine 100 according to the second embodiment is not illustrated in the drawings and the same portions as those in the first embodiment are denoted by the same reference numerals and an explanation thereof is omitted. In this embodiment, only different portions will be described.

In the cooling fans 60 and 70 according to the second embodiment, there is a plurality of hole-like holding portions described above that are provided on a concentric circle centered on the axial center portion of the rotor shaft 6, as shown in FIG. 5. The number of the hole-like holding portions is not specifically limited; however, it is desirable to provide three or more hole-like holding portions in each of the cooling fan 60 and the cooling fan 70. In this case, it is desirable that the hole-like holding portions be arranged at equal intervals on a concentric circle centered on the axial center portion of the rotor shaft 6. Moreover, the number of the insertion holes 80 and 90 formed in the first bracket 1 (or the second bracket 2) is set to be equal to or more than a number corresponding to the number of the bearing attaching and detaching jigs 20a and 20b. Moreover, the insertion holes 80 and 90 are provided on a concentric circle centered on the axial center portion of the rotor shaft 6 and are arranged at intervals corresponding to those of the hole-like holding portions. Moreover, the distance from the center line of the rotor shaft 6 to the center of the insertion holes 80 and 90 is set to be equal to the distance from the center line of the rotor shaft 6 to the center of the hole-like holding portions.

Next, the bearing changing method of the rotary electric machine 100 according to the second embodiment will be explained.

First, an operation of detaching the cartridges 29 and 49 will be explained. When the bearing attaching and detaching jigs 20a and 20b are inserted into the insertion holes 80 and 90, respectively, if a gap is generated between the end portions 13a and 13b and the hole-like holding portions, respectively, the axial center position of the rotor 7 may be displaced and the outer peripheral surface of the laminated core 4 may interfere with the inner peripheral surface of the stator core 3. In order to prevent such interference, it is desirable that the bearing attaching and detaching jigs 20a and 20b be screwed in until the end portions 13a and 13b thereof come into contact with the hole-like holding portions, respectively.

When the end portions 13a and 13b of the bearing attaching and detaching jigs 20a and 20b are held in the hole-like holding portions, respectively, the cooling fans 60 and 70 are fixed by the bearing attaching and detaching jigs 20a and 20b, respectively. Accordingly, the rotor 7 is also fixed by the bearing attaching and detaching jigs 20a and 20b; therefore, even when the cartridges 29 and 49 are detached in this state, the laminated core 4 does not come into contact with the stator core 3.

On the drive side 82, the cartridge 29 can be detached by removing a fastening member (not illustrated). On the counter drive side 81, the cartridge 49 can be detached by removing a fastening member (not illustrated) in a similar manner. The operation of attaching the new cartridges 29 and 49 in which the bearings 27 and 47 and lubricating grease are changed is similar to that of the first embodiment; therefore, the explanation thereof is omitted.

It is desirable that the number of the bearing attaching and detaching jigs 20a and the number of the bearing attaching and detaching jigs 20b be three or more in order to stably fix the rotor 7. In this case, the number of the insertion holes 80 and 90 formed in the first bracket 1 (or the second bracket 2) is equal to or more than the number corresponding to the number of the bearing attaching and detaching jigs 20a and 20b, and the insertion holes 80 and 90 are arranged, for example, at equal intervals on a concentric circle centered on the axial center portion of the rotor shaft 6.

As explained above, the rotary electric machine 100 according to the second embodiment includes the stator core (stator) 3; the rotor 7 that includes the laminated core (rotor core) 4 that is arranged on the inner peripheral side of the stator core 3 and is formed by laminating magnetic steel sheets, the core holders 5 and 11 that cover both ends of the laminated core 4, and the cooling fans 60 and 70 that are attached to the core holders 5 and 11; the frame that includes the tubular unit 9 enclosing the stator core 3 and the rotor 7 and the rotor shaft supporting units (the first bracket 1 and the second bracket 2) that support the rotor shaft 6, the frame extending in a direction of the rotor shaft; and the cartridges (bearing units) 29 and 49 that are detachably attached to the rotor shaft supporting units (1, 2) and rotatably support the rotor shaft 6, wherein the hole-like holding portions, which hold the end portions 13a and 13b of the bearing attaching and detaching jigs 20a and 20b that are inserted through the rotor shaft supporting units (1, 2), are provided in the cooling fans 60 and 70. Therefore, the effect similar to that of the first embodiment can be obtained.

Moreover, because a plurality of hole-like holding portions are provided on a concentric circle centered on the axial center portion of the rotor shaft 6, the cost associated with the processing of the cooling fans 60 and 70 can be reduced compared with the case of circumferentially providing the groove-like holding portions 64 and 74.

Moreover, the hole-like holding portions according to the second embodiment are formed in a tapered shape such that the end portions 13a and 13b can come into contact with the side surfaces of the holding portions, respectively, and the non-contact portions 64b and 74b are formed between the end portions 13a and 13b and the bottom surfaces of the holding portions, respectively. With such a configuration, in a similar manner to the first embodiment, the rotor 7 can be fixed without causing the axial center position of the rotor 7 to be displaced from the axial center position of the tubular unit 9.

Moreover, the hole-like holding portions according to the second embodiment are formed in a tapered shape such that the end portions 14a and 14b can come into contact with the side surfaces of the hole-like holding portions, respectively, and the non-contact portions 64b and 74b are formed between the end portions 14a and 14b and the bottom surfaces of the hole-like holding portions, respectively. With such a configuration also, in a similar manner to the first embodiment, the rotor 7 can be fixed without causing the axial center position of the rotor 7 to be displaced from the axial center position of the tubular unit 9.

Moreover, the bearing attaching and detaching jigs 20a and 20b used in the rotary electric machine 100 according to the second embodiment are formed into a bolt shape such that they are inserted into the rotor shaft supporting units (1, 2) and are held in the hole-like holding portions provided in the cooling fans 60 and 70, respectively. Therefore, when the cartridges 29 and 49 are attached and detached, the rotor 7 can be fixed without causing the laminated core 4 to come into contact with the stator core 3, and, moreover, the bearing attaching and detaching jigs 20a and 20b can be manufactured at low cost.

Moreover, the bearing changing method applied to the rotary electric machine 100 according to the second embodiment includes a jig attaching step of attaching the bearing attaching and detaching jigs 20a and 20b that are inserted into the rotor shaft supporting units (1, 2) and are held in the hole-like holding portions formed in the cooling fans 60 and 70 to the rotor shaft supporting units (1, 2); a rotor fixing step of causing the hole-like holding portions to hold the end portions 13a and 13b (the end portions 14a and 14b) of the bearing attaching and detaching jigs 20a and 20b and fixing the rotor 7 by screwing the bearing attaching and detaching jigs 20a and 20b into the rotor shaft supporting units (1, 2); and a bearing changing step of detaching the cartridges 29 and 49 from the rotor shaft supporting units (1, 2) and attaching the new cartridges 29 and 49 to the rotor shaft supporting units (1, 2). Therefore, when the cartridges 29 and 49 are attached and detached, the cartridges 29 and 49 can be changed without causing the laminated core 4 to come into contact with the stator core 3 and easily compared with a method of the conventional technology.

Moreover, as illustrated in FIG. 3(a) and FIG. 3(b), the end portions 13a and 13b of the bearing attaching and detaching jigs 20a and 20b are formed in a tapered shape such that the top portions 64a and 74a of the hole-like holding portions can come into contact with the end portions 13a and 13b before the end portions 13a and 13b reach the bottom surfaces of the hole-like holding portions, respectively. In this case, the hole-like holding portions may be formed in a tapered shape in a similar manner to the holding portions 64 and 74 illustrated in FIG. 3(a), or may be formed in a rectangular shape in a similar manner to the holding portions 64 and 74 illustrated in FIG. 3(b). With such a configuration, the rotor 7 can be fixed without causing the axial center position of the rotor 7 to be displaced from the axial center position of the tubular unit 9.

In the explanation of the first and second embodiments, the first bracket 1, the second bracket 2, and the tubular unit 9 are configured as separate components; however, the rotary electric machine 100, the bearing attaching and detaching jigs, and the bearing changing method according to the present embodiment can also be applied to the rotary electric machine that includes a frame in which the first bracket 1, the second bracket 2, and the tubular unit 9 are integrated.

The structure in which the groove-like holding portions 64 and 74 according to the first embodiment or the hole-like holding portions according to the second embodiment hold the bearing attaching and detaching jigs 20*a* and 20*b* may be applied only to the side of a cartridge (for example, the cartridge 29 on the drive side 82) that is expected to be changed more frequently. Even with such a configuration, when the cartridge 29 on the drive side 82 is detached, the rotor shaft 6 provided to extend toward the counter drive side 81 is supported by the bearing 47 arranged on the counter drive side 81; therefore, the workability in attachment and detachment of the cartridge 29 on the drive side 82 is not reduced. Moreover, it is not necessary to form the insertion holes 90 for the bearing attaching and detaching jigs 20*b* and the groove-like holding portion 74 or the hole-like holding portions provided on the second bracket 2 side; therefore, the processing cost can be reduced.

The bearing attaching and detaching jig 20*a* and the bearing attaching and detaching jig 20*b* may have lengths and diameters different from each other.

The bearing attaching and detaching jigs and the bearing changing method according to the first and second embodiments are not limited to the case of the totally-enclosed internal-fan-cooled rotary electric machine 100 and, for example, can be used for a totally-enclosed external-fan-cooled rotary electric machine or the like.

The shape of the holding portions 64 and 74 according to the first and second embodiments is not limited to a tapered shape or a rectangular shape and may be formed in a round shape (curved shape). With such a shape, even if the bearing attaching and detaching jigs 20*a* and 20*b* are made of a material (such as aluminum) softer than the main plates 63 and 73, the bearing attaching and detaching jigs 20*a* and 20*b* can be prevented from being damaged.

The rotary electric machines 100 according to the first and second embodiments are an example of the content of the present invention and it goes without saying that they can be combined with other publicly known technologies and can be changed by, for example, omitting a part thereof without departing from the gist of the present invention.

INDUSTRIAL APPLICABILITY

As described above, the present invention can be applied to a rotary electric machine, and is particularly useful as an invention that can simplify the operation of attaching and detaching a bearing.

REFERENCE SIGNS LIST

1 first bracket (rotor shaft supporting unit)
2 second bracket (rotor shaft supporting unit)
3 stator core (stator)
4 laminated core (rotor core)
5, 11 core holder
6 rotor shaft
7 rotor
8 stator coil
9 tubular unit
20*a*, 20*b* bearing attaching and detaching jig
11*a*, 11*b* externally threaded portion
12*a*, 12*b* bolt head
13*a*, 13*b* end portion
25, 45 bearing cap
26, 28, 46, 48 bearing stopper
27, 47 bearing
29, 49 cartridge (bearing unit)
60, 70 cooling fan
63, 73 main plate
64, 74 holding portion
64*a*, 74*a* top portion
80, 90 insertion hole
81 counter drive side
82 drive side
100 rotary electric machine

The invention claimed is:

1. A rotary electric machine comprising:
a stator;
a rotor that includes
a rotor core that is arranged on an inner peripheral side of the stator and is formed by laminating magnetic steel sheets,
a core holder that covers both ends of the rotor core, and
a cooling fan that is attached to the core holder;
a frame that includes
a tubular unit that encloses the stator and the rotor, and
a rotor shaft supporting unit that supports the rotor shaft; and
a bearing unit that is detachably attached to the rotor shaft supporting unit and rotatably supports the rotor shaft, wherein
the cooling fan includes a main plate that is formed such that a diameter of the main plate increases toward the bearing unit from the core holder,
a groove-like or hole-like holding portion, configured to hold an end portion of a bearing attaching and detaching jig inserted through the rotor shaft supporting unit, is provided in the main plate, and
the main plate includes a thick portion that is thicker than a portion in which the holding portion is not provided.

2. The rotary electric machine according to claim 1, wherein
the groove-like holding portion is provided along a circumferential direction of the cooling fan, and
a plurality of the hole-like holding portions are provided on a concentric circle centered on an axial center portion of the rotor shaft.

3. The rotary electric machine according to claim 1, wherein
a side surface of the holding portion is formed in a tapered shape such that the end portion of the bearing attaching and detaching jig is capable of coming into contact with the side surface of the holding portion, and
a non-contact portion is formed between the end portion and a bottom surface of the holding portion.

4. A bearing changing method of changing a bearing unit, which is applied to a rotary electric machine that includes a stator; a rotor that includes a rotor core that is arranged on an inner peripheral side of the stator and is formed by laminating magnetic steel sheets, a core holder that covers both ends of the rotor core, and a cooling fan that is attached to the core holder; a frame that includes a tubular unit that encloses the stator and the rotor, and a rotor shaft supporting unit that supports the rotor shaft; and the bearing unit that is detachably attached to the rotor shaft supporting unit and rotatably supports the rotor shaft, and in which the cooling fan includes a main plate that is formed such that a diameter of the main plate increases toward the bearing unit from the core holder, a groove-like or hole-like holding portion, configured to hold an end portion of a bearing attaching and detaching jig inserted through the rotor shaft supporting unit, is provided in the main plate, and the main plate includes a thick portion that is thicker than a portion in which the holding portion is not provided, the bearing changing method comprising:
- a jig attaching step of attaching the bearing attaching and detaching jig to the rotor shaft supporting unit;
- a rotor fixing step of causing the holding portion to hold an end portion of the bearing attaching and detaching jig and fixing the rotor by screwing the bearing attaching and detaching jig into the rotor shaft supporting unit; and
- a bearing changing step of detaching the bearing unit from the rotor shaft supporting unit and attaching a new bearing unit to the rotor shaft supporting unit.

5. The bearing changing method according to claim 4, wherein
- the groove-like holding portion is provided along a circumferential direction of the cooling fan, and
- a plurality of the hole-like holding portions are provided on a concentric circle centered on an axial center portion of the rotor shaft.

6. The bearing changing method according to claim 4, wherein the end portion of the bearing attaching and detaching jig is formed in a tapered shape such that a top portion of the holding portion is capable of coming into contact with the end portion before the end portion reaches a bottom surface of the holding portion.

\* \* \* \* \*